US012614248B2

(12) United States Patent
Hargreaves et al.

(10) Patent No.: US 12,614,248 B2
(45) Date of Patent: Apr. 28, 2026

(54) COORDINATED SUPER-RESOLUTION PROCESSING BY NON-NATIVE HARDWARE PROCESSING SYSTEMS

(71) Applicant: MICROSOFT TECHNOLOGY LICENSING, LLC, Redmond, WA (US)

(72) Inventors: Shawn Lee Hargreaves, Seattle, WA (US); William John Kristiansen, Duvall, WA (US); Larry Nai-Ning Chen, Bellevue, WA (US); Luke Jonathan Olsen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 314 days.

(21) Appl. No.: 18/210,467

(22) Filed: Jun. 15, 2023

(65) Prior Publication Data

US 2024/0420281 A1  Dec. 19, 2024

(51) Int. Cl.
*G06T 3/4053*  (2024.01)
*G06F 9/50*  (2006.01)
*G06T 1/20*  (2006.01)
*G06T 3/4046*  (2024.01)

(52) U.S. Cl.
CPC .......... *G06T 3/4053* (2013.01); *G06F 9/5044* (2013.01); *G06T 1/20* (2013.01); *G06T 3/4046* (2013.01); *G06F 2209/509* (2013.01)

(58) Field of Classification Search
None
See application file for complete search history.

(56) References Cited

U.S. PATENT DOCUMENTS

2022/0130013 A1* 4/2022 Pottorff ................ G06T 3/4053
2022/0222778 A1* 7/2022 Liu ........................ H04N 25/48
2022/0261958 A1* 8/2022 Akkaraju ................ G06T 7/90

OTHER PUBLICATIONS

"Neural Networks API I Android NDK I Android Developers", Retrieved from the Internet URL:—https://web.archive.org/web/20230614073700/https: 1/developer.android.com/ndklguides/neuralnetworks, Jun. 14, 2023, 48 Pages.
"Synchronization framework I Android Open-Source Project", Retrieved from the Internet URL:—https://web.archive.org/web/20230601014206/https:1/source.android.com/docs/core/graphics/sync, Jun. 1, 2023, 06 Pages.
Dong, et al., "RenderSR: A Lightweight Super-Resolution Model for Mobile Gaming Upscaling", Proceedings of the IEEE/CVF Conference on Computer Vision and Pattern Recognition, Jun. 19, 2022, pp. 3086-3094.
International Search Report and Written Opinion received for PCT Application No. PCT/US2024/032464, Sep. 19, 2024, 14 pages.
International Preliminary Report on Patentability (Chapter I) received for PCT Application No. PCT/US2024/032464, mailed on Dec. 26, 2025, 11 pages.

* cited by examiner

*Primary Examiner* — Mark R Milia
(74) *Attorney, Agent, or Firm* — Workman Nydegger

(57) ABSTRACT

Systems are configured for performing super-resolution processing for applications by a plurality of different hardware processing units that include hardware processing units that are native to the applications and hardware processing units that are non-native to the applications. Interfaces in the system generate different sets of instructions that are submitted to the different processing units with synchronization objects that synchronize the execution of the instructions.

20 Claims, 5 Drawing Sheets

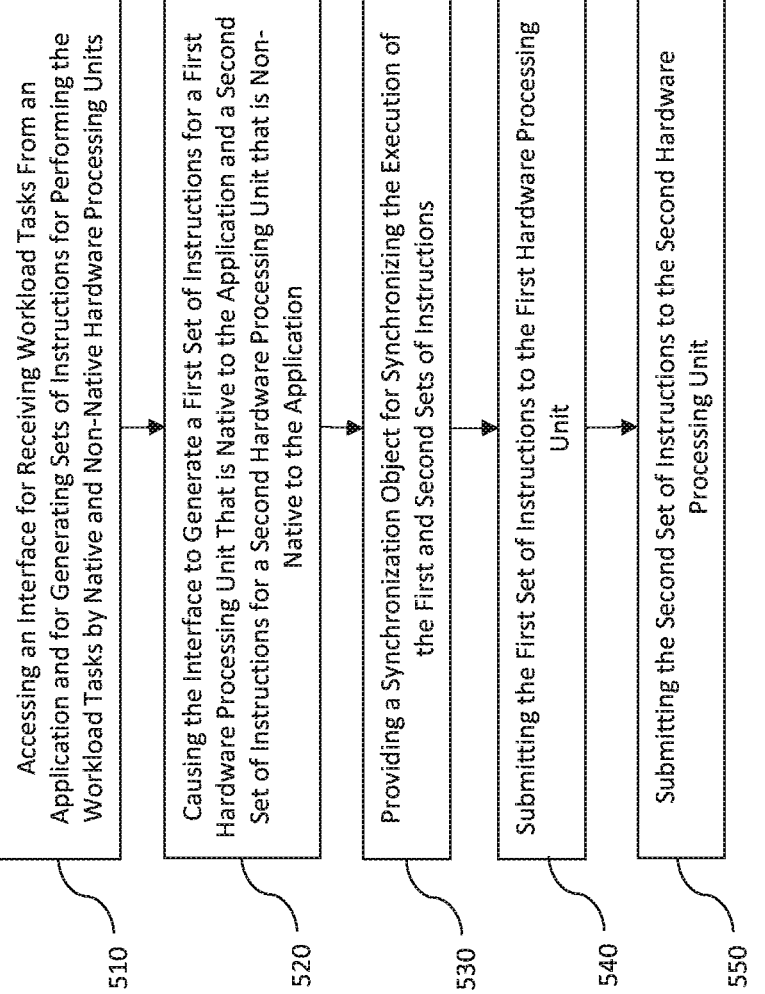

500

510 — Accessing an Interface for Receiving Workload Tasks From an Application and for Generating Sets of Instructions for Performing the Workload Tasks by Native and Non-Native Hardware Processing Units 520 — Causing the Interface to Generate a First Set of Instructions for a First Hardware Processing Unit That is Native to the Application and a Second Set of Instructions for a Second Hardware Processing Unit that is Non-Native to the Application 530 — Providing a Synchronization Object for Synchronizing the Execution of the First and Second Sets of Instructions 540 — Submitting the First Set of Instructions to the First Hardware Processing Unit 550 — Submitting the Second Set of Instructions to the Second Hardware Processing Unit

FIG. 5

COORDINATED SUPER-RESOLUTION PROCESSING BY NON-NATIVE HARDWARE PROCESSING SYSTEMS

BACKGROUND

With conventional image processing, it is possible to render images at a variety of display resolutions. This is particularly beneficial for enabling content that is saved at one resolution to be rendered at different resolutions on a plurality of different display devices having different display capabilities. For example, images that are saved at low resolutions can be upscaled to higher resolutions for display on high-resolution displays.

The upscaling of images is sometimes referred to as super-resolution processing. With super-resolution processing, a higher resolution image of a base image is generated by rendering the base image with a higher pixel density than the underlying base image. For example, a base image having a 2K resolution (1920×1080 pixel resolution) can be upscaled to a 4K resolution image (3840×2160 pixel resolution) by converting each of the pixels in the base image into four new upscaled pixels.

Super-resolution processes utilize specialized algorithms that are configured to generate outputs comprising new details for the newly upscaled pixels, which are not present in the underlying pixels, and such that the new upscaled pixels are not mere duplicates of the underlying base pixels from which they depend. By way of example, each of the new pixels in an upscaled image will usually contain a unique set of properties that are derived from some combination of the underlying base pixels' properties, as well as the properties of the neighboring pixels that are contained within the base image and, in some instances, the new pixel properties will also be based at least in part on the properties of other new neighboring pixels of the upscaled image.

Many different types of super-resolution algorithms and techniques can be used to upscale and enhance an image. For instance, some super-resolution processes can be used to smooth out the edges of the new pixels that are being generated. Some super-resolution processes can also be used to cause the final upscaled images to appear more detailed than the underlying images from which they are based. The super-resolution model algorithms can be tuned for different desired outcomes and styles by controlling algorithm weights applied to control variables or parameters of the algorithms that are based on attributes of the images being processed.

Recent developments in computer technologies include the creation of machine learning models that can be trained to perform various tasks, including upscaling and other forms of super-resolution image processing. Super-resolution machine learning models, for example, can be configured with one or more of the super-resolution processing algorithms that are trained to perform super-resolution processing on a particular type or class of lower-resolution images by applying the models to training data that comprises pairs of low-resolution and high-resolution images and in such a manner as to consistently generate images of a high-resolution based on inputs comprising low-resolution images, similar to the training data.

The subject matter claimed herein is not limited to embodiments that solve any disadvantages or that operate only in environments such as those described above. Rather, this background is only provided to illustrate one example technology area where some embodiments described herein may be practiced.

SUMMARY

Disclosed embodiments include systems and methods for performing super-resolution processing for applications by a plurality of different hardware processing units that include hardware processing units that are native to the applications and hardware processing units that are non-native to the applications.

In one embodiment, a computing system includes a first hardware processing unit, such as a GPU that is native to an application. The GPU is considered native to the application when the application has code written in a format specifically configured for execution by the GPU and/or when the GPU is selected by the OS as a default processing unit for performing image processing by the application.

The computing system also includes a second hardware processing unit that is considered non-native to the application, since the code of the application is not specifically written for execution by the second hardware processing unit and/or the second hardware processing unit is not initially selected by the OS as a default processing unit for performing image processing by the application when the application is loaded for execution. The second hardware processing unit may be a neural processing unit (NPU) or a secondary GPU, for example, that includes machine learning models that are trained to perform super-resolution.

The disclosed embodiments include systems that provide an interface (e.g., an application programming interface (API)) that defines the calls and functions that can be made to the hardware processing units and the formats and conventions to be used. The interface is configured to generate sets of instructions for performing the workload tasks by (i) the first hardware processing unit that is native to the application, as well as (ii) the second hardware processing unit that is non-native to the application.

The systems also cause the interface, in response to receiving the workload tasks from the application during execution of the application, to generate a first set of instructions to be executed by the first processing unit for performing a first type of workload tasks (e.g., generating images at a first resolution) and a second set of instructions to be executed by the second hardware processing unit for performing a second type of workload tasks (e.g., super-resolution processing).

The systems also provide one or more synchronization objects with the first and/or second sets of instructions for synchronizing coordinated execution of the first and second sets of instructions. In one implementation, the synchronization objects include signal and fence instructions that are included within the sets of instructions and which create explicit dependencies between the execution of instructions in the first and second sets of instructions.

The systems submit the first set of instructions to the first hardware processing unit for execution by the first hardware processing unit and the second set of instructions to the second hardware processing unit for execution by the second hardware processing unit, while coordinating the synchronized execution of the first and second sets of instructions through the use of the synchronization objects.

In some instances, the system identifies the second hardware processing unit from a plurality of available and different processing units based on a determination that there is a capability for performing the second type of work task by the second hardware processing unit that is greater than a capability for performing the second type of work task by another processing unit in the plurality of different processing units.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 5 illustrates an example of a processing flow associated with performing super-resolution processing for applications by a plurality of different hardware processing units that include hardware processing units that are native to the applications and hardware processing units that are non-native to the applications.

DETAILED DESCRIPTION

Figure 1:
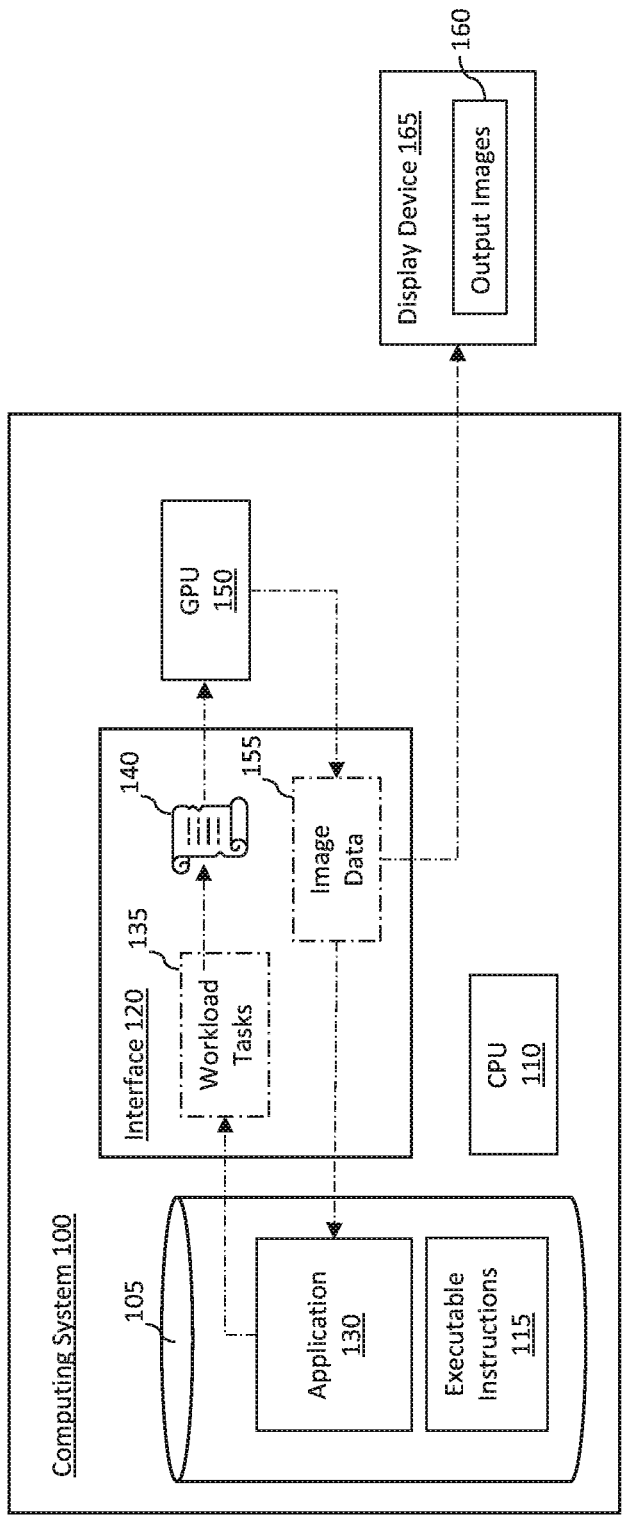
FIG. 1 illustrates an example of a computing system performing workload tasks with a GPU.

Disclosed embodiments include methods and systems for performing super-resolution processing for applications by a plurality of different hardware processing units that include hardware processing units that are native to the applications and hardware processing units that are non-native to the applications.

As noted above, super-resolution machine learning models have been developed for performing super-resolution processing. It is also noted that machine learning models that perform upscaling often rely on the processing power of a graphics processing unit (GPU) that is separate from, but connected to, the central processing unit (CPU) of the computing system. One reason for offloading the image processing to a GPU is that the processing load required to perform many machine learning tasks related to image processing, such as super-resolution processing, is too intensive to be executed by the CPU. In particular, it is noted that the CPU is already burdened with processing tasks associated with the execution of the operating system (OS) and the various applications running on the OS. So, when a game or other graphics-intensive application requires computationally expensive image processing, that processing is typically assigned to the GPU.

Some game developers code their software specifically for particular processor configurations, which can facilitate efficient processing. By way of example, a game may have code that is directed to a particular GPU. In other instances, a game may be coded with general-purpose GPU programming that is intentionally compatible with different GPUs, but which is subsequently compiled to be compatible for execution by a particular GPU.

During the execution of a software application, the computing system OS will route GPU image processing requests to the GPU that is native to the software that is being executed. The GPU may be considered native to the software being executed, for example, if the developer has coded the software specifically for that GPU configuration (e.g., a particular GPU manufacturer or GPU model).

A particular GPU can also be considered native to the software that is executing when the GPU has been pre-selected by OS default or user-directed input for that software during execution. By way of example, some operating systems have settings that enable a pre-selection of the GPU to be used for different applications, to accommodate different preferences (e.g., power savings or performance). The selection of the GPU to be used may be made by an OS default setting when the software is loaded for execution. Sometimes, OS interfaces are utilized to enable a user to pre-select the GPU that will be used for each application.

While the use of a GPU can significantly improve the performance of a system performing super-resolution, the performance improvements can be realized even more by selectively utilizing a distributed set of different GPU(s) to perform the super-resolution processing. For instance, it is possible to generate and route different image processing instructions to separate hardware processing units for performing different tasks associated with the image processing, including super-resolution processing. Even more particularly, a first set of instructions for performing the initial generation of images can be sent to a first hardware processing unit (e.g., GPU) and a second set of instructions for performing super-resolution on the generated images can be sent to a separate hardware processing unit (e.g., another GPU or an NPU). The performance improvements associated with the distribution of the image processing tasks in this manner include reduced loads placed on the GPU(s), increased capabilities for performing the super-resolution, and reduced latency when performing the super-resolution processing.

In some instances, the referenced first hardware processing unit is a primary GPU that is native to the application being executed. In particular, a hardware processing unit is considered native to the application when the application includes code written in a language or format specific to the hardware processing unit and/or when the hardware GPU has been pre-selected by the OS running the application to perform the image processing instructed by the application. Various manufacturers of GPUs are capable of performing image processing and that may be referenced by an application or OS, such that they are native to the application. Some example GPU manufacturers include NVIDIA, Intel, and AMD. Applications may reference and/or be written with code specific to a GPU model that is considered native to the application.

When a computing system includes more than one hardware processing unit configured to perform image processing (e.g., a first GPU, as well as a second GPU and/or an NPU), the disclosed methods and systems may utilize an interface to selectively control the submission and synchronization of instructions for application workloads that are submitted to and executed by the different hardware processing units, including instructions that are submitted to and executed by hardware processing units that are considered non-native to the applications generating the application workloads.

Attention is now directed to FIG. 1. As shown, a computing system 100 is configured with a storage device 105 and a processor (e.g., CPU 110). The processor is configured to execute stored executable instructions 115 for implementing the functionality described herein, including the functionality performed by interface 120 for managing the submission and synchronization of sets of instructions that are routed to hardware processing units (e.g., GPU 150) to perform workloads created by applications running on the computing system 100, such as application 130 (e.g., a graphics-intensive software game).

As described below, interface 120 identifies workload tasks 135 associated with the execution of the application 130 and generates corresponding sets of instructions (e.g., set of instructions 140) for performing the workload tasks, such as image processing tasks, that are performed by hardware processing units, such as GPU 150. Interface 120 may be an application programming interface, for example, that defines calls and requests that can be made to the different hardware processing units connected through Interface 120, as well as the formats and conventions to use when making the calls and requests.

In some instances, interface 120 is connected to other APIs (not shown) that are specific to the GPU 150 and/or other components of the computing system.

In some instances, GPU 150 is native to the application, with the code of the application corresponding to image processing to be performed by the GPU being written in a format specific to a format required by the GPU. The GPU 150 may also be considered native to the application when the OS of the computing system (not shown), which is stored in storage 105 and executed by CPU 110 has pre-selected the GPU 150 for performing the image processing required by the application. This pre-selection can be made by the OS during the loading of the application, for example.

When application 130 is executed by the computing system 100, which includes the execution of the set of instructions 140 submitted to the GPU 150, image data 155 is generated for application 130. The image data 155 comprises output images 160 or instructions for rendering the output images 160 in a desired format and resolution on a display device 165 connected to the computing system 100.

The display device 165 may be integrally connected to and a part of the computing system 100 (e.g., a laptop screen). Alternatively, the display device may be a separate device that is connected to the computing system 100 (e.g., a monitor, television, or other detached display). The connection between the computing system 100 and the display device 165 may be wireless or wired.

Figure 2:
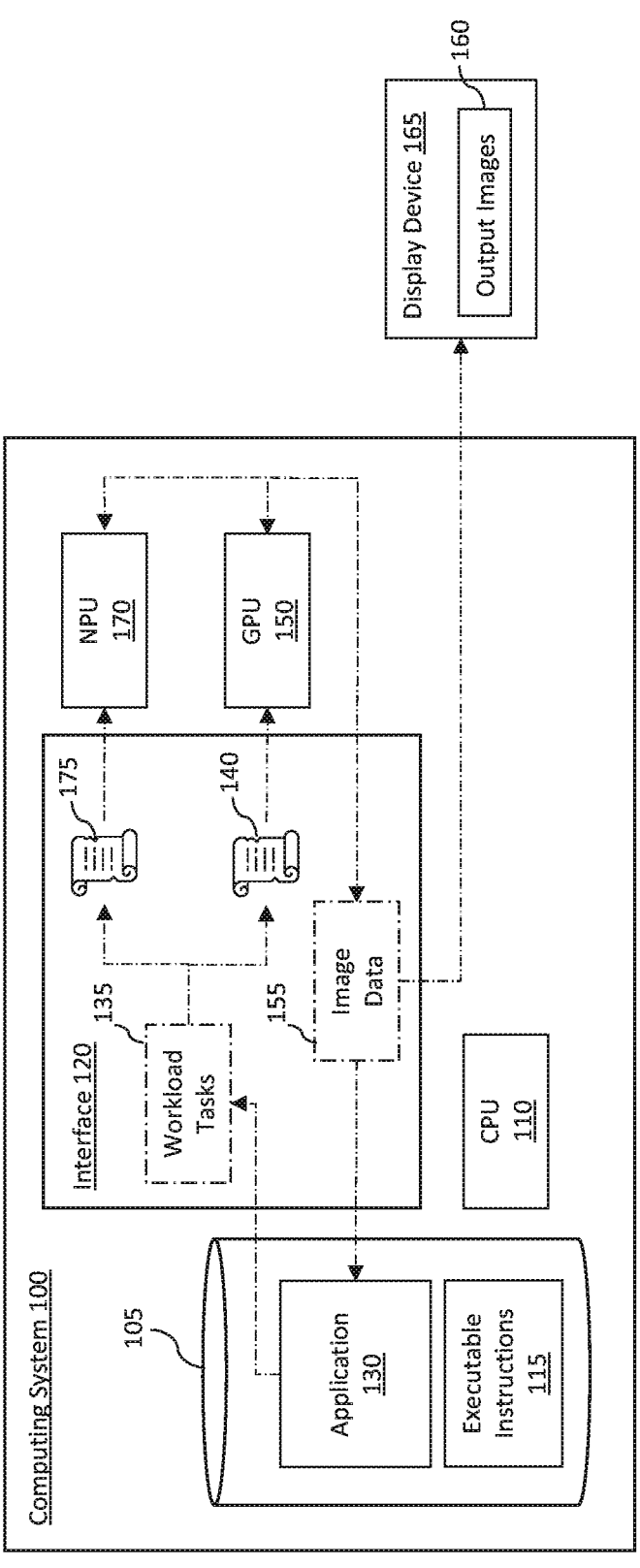
FIG. 2 illustrates an example of a computing system performing workload tasks with a GPU and an NPU.

In some instances, the computing system 100 includes multiple hardware processing units, as shown in FIG. 2, which may include the GPU 150 that is native to the application 130, as well as at least one non-native hardware processing unit (e.g., NPU 170).

The NPU 170 may comprise a specialized processing unit configured with a machine learning module that is trained for performing super-resolution. This super-resolution may include the restructuring of image data (e.g., low-resolution images) generated by the GPU into new image data (e.g., high-resolution images having a resolution that is higher than the low-resolution images).

A list of examples of super-resolution machine learning models that may be incorporated into and/or utilized by the NPU include the Laplacian Pyramid Super-Resolution network (LapSRN), the Fast Super-Resolution Convolutional Neural Network (FSRCNN), and Efficient Sup-Pixel Convolutional Neural Network (ESPCN).

The NPU 170 may also include other modules for performing image processing besides upscaling, such as anti-aliasing.

Other image processing may also be performed by the NPU 170, and/or the GPU 150, including any processing that modifies or applies a particular style, format, orientation, coloring, contrast, brightness, filtering, masking, and/or other imaging transformation to images that are included in or defined by the image data 155 and that results in the output images 160 rendered on the display device 165.

In some instances, interface 120 identifies affinities of workload tasks for different hardware processing units based on attributes of the different hardware processing units. For example, the interface can identify that NPU 170 includes a machine-learning model for performing super-resolution and/or other specialized image processing tasks. Such an identification can be made through declarations made by or for the NPU 170 when the drivers for the NPU 170 are installed and/or when the NPU 170 is connected to the computing system.

Then, when interface 120 detects a workload task of a particular type (e.g., super-resolution processing), interface 120 may identify and select a particular hardware processing unit, from a plurality of available and different hardware processing units, that has a greater capability for performing that task than other hardware processing units. For example, interface 120 may identify NPU 170 is configured with one or more super-resolution processing modules corresponding to a super-resolution processing workload task that GPU 150 is not specifically configured to perform, such that NPU 170 has a greater capability to perform that super-resolution task than GPU 150. This may be the case, even though NPU 170 is considered non-native to application 130. In particular, application code may be written in a format or language that is generic to GPUs or that is specific to GPU 150.

However, once interface 120 identifies a workload task that is more appropriate for the non-native NPU 170 than GPU 150, the interface can generate a separate set of instructions 175 to be executed by the NPU 170. The generation of the set of instructions 175 and/or the execution of the set of instructions 175. This may include compiling the set of instructions 175 into a format that is recognized by and executable by NPU 170.

In some instances, the sets of instructions 140 and 175 that are generated for and routed to the GPU 150 and NPU 170, respectively, are transmitted to an API and/or queue specific to the different hardware processors.

When the image data 155 is processed by the different hardware processors (e.g., GPU 150, NPU 170) the image data 155 can be cached into buffers and volatile storage components of the storage 105. The individual hardware processors may also include cache storage that can be used during the processing of the image data 155.

The Interface 120 facilitates communications between the different hardware processors and other components of the computing system, as well as with the display device 165.

Figure 3:
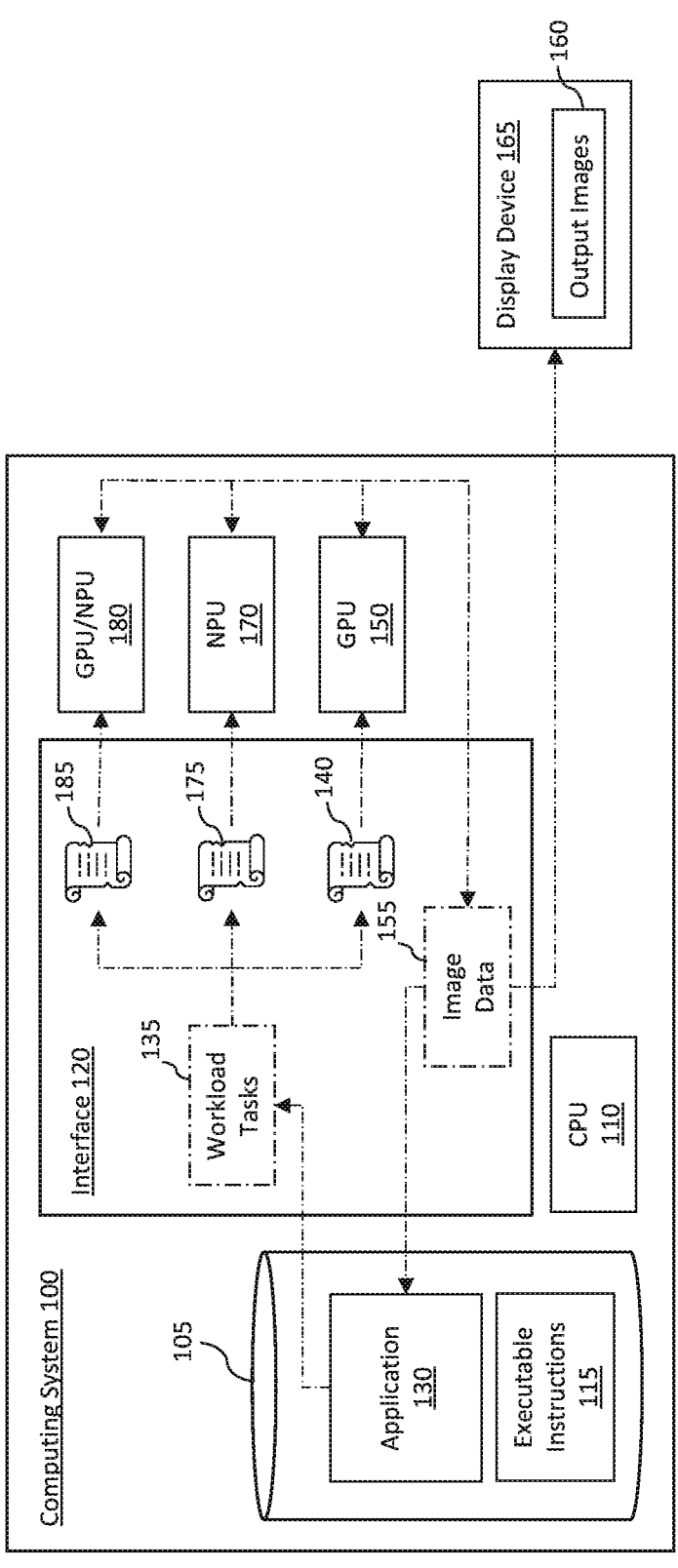
FIG. 3 illustrates an example of a computing system performing workload tasks with a plurality of hardware processing units, including one or more GPU and NPU.

Attention is now directed to FIG. 3. In this illustration, the computing system 100 includes multiple hardware processing units, including GPU 150, NPU 170, and another GPU/NPU 180. GPU/NPU 180 comprises either a secondary GPU or NPU or a GPU having an NPU integrated within the GPU. The GPU/NPU 180 includes specialized neural processing modules configured for performing specialized image processing tasks, such as super-resolution processing, stylizing, or other imaging.

In this example, interface 120 may detect that display device 165 comprises display capabilities for rendering an image at a resolution that is higher than the resolution that application 130 is directing the computing system 100 to generate. Interface 120 may also determine that NPU 170 includes machine learning modules trained for upscaling images generated at a lower resolution by GPU 150 or GPU/NPU 180 into the higher resolution that the display device 165 is configured to render images at.

The interface 120 may also determine that GPU 150 and GPU/NPU 180 are not configured with machine learning modules for making the same upscaling transformations but are capable of performing different imaging tasks. For instance, interface 120 may determine that GPU 150 is capable of or configured with modules for generating images at a first resolution and style specified by the application. In this regard, the GPU 150 may be native to the application, wherein the GPU 150 is pre-selected as the default hardware processor for generating images for application 130. Although not required, the application workload tasks 135 processed by the interface 120 may also include instructions formatted for execution by GPU 150.

The interface 120 may also determine that GPU/NPU 180 is configured with modules for transforming images from a first style (e.g., an animation style specified by the application) into transformed images having a different style (e.g., a style specified by a user, such as a realistic style or a style that alters the animation style provided by the application into a different animation style). For instance, a user may install a feature into their system that enables a user to select different styles that can be applied to images generated by the system. This feature may be part of the GPU/NPU 180 or a driver or plugin that is connected to the GPU/NPU 180. Then, when a user selects a particular style to use for rendering images generated for the application, interface 120 can detect this user input and responsively generate instructions for the GPU/NPU 180 to transform images produced for application 130 into the desired style.

Likewise, interface 120 may also detect or determine that an instruction has been received for rendering images for application 130 at the higher resolution that the display device 165 is capable of rendering at, even though the application workload tasks received from application 130 do not specify that requirement. This instruction can be detected, for instance, in response to user input entered at a menu or control associated with interface 120 (now shown).

In the current example, when a workload for application 130 is received by interface 120 with workload tasks 135 for generating images corresponding to a runtime implementation of application 130, interface 120 can split up and route different image processing tasks to the different hardware processing units corresponding to the different functionalities and affinities associated with each of the hardware processing units.

In particular, interface 120 can generate a first set of instructions 140 for the GPU 150 to perform the image processing tasks associated with drawing the initial objects that will be included in the images, performing initial shading, and coloring, and generating the images at a first resolution specified by the application.

The interface 120 can also generate a second set of instructions 175 for the NPU 170 to upscale the images generated by the GPU 150 or GPU/NPU 180, as well as a third set of instructions 185 for the GPU/NPU to transform the style of the images output from either the GPU 150 or the NPU 170.

The sets of instructions can be formatted into different formats and conventions that are compatible with the different hardware processing units. The process of formatting the sets of instructions may include compiling or reformatting the instructions from one format to a format that is specifically configured for and compatible with the hardware processing unit(s) receiving the instructions. In this regard, the different sets of instructions may be formatted differently for different GPU or NPU manufacturer protocols and conventions.

In some instances, the sets of instructions are configured as control lists that contain a plurality of individual instructions.

In some instances, interface 120 also generates and includes synchronization objects with the sets of instructions. The synchronization objects may include, for example, a fence or signal script that creates a temporal or sequential dependency between the execution of instructions contained in different sets of instructions. This will be explained more clearly with the example that follows.

Figure 4:
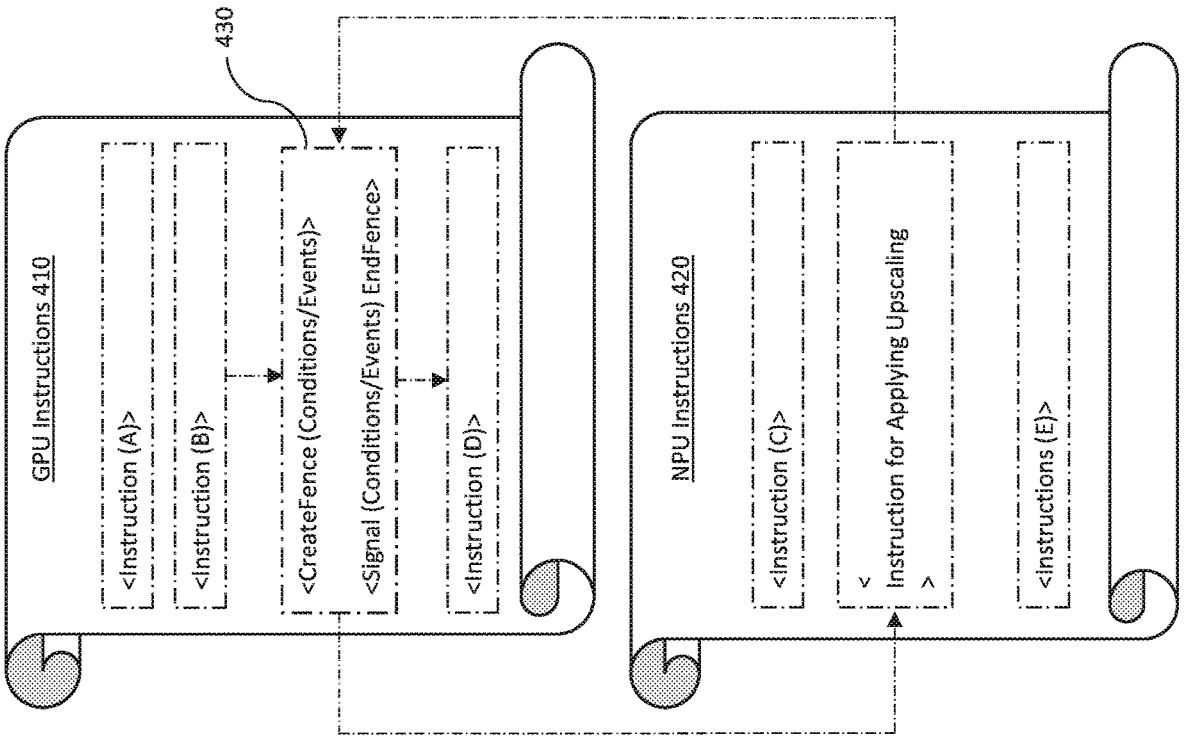
FIG. 4 illustrates an example of a first set of instructions and a second set of instructions, the first set of instructions including a synchronization object, and the second set of instructions including an instruction to perform super-resolution processing.

As shown in FIG. 4, two sets of instructions are presented. These sets of instructions were generated by Interface 120 for workload tasks received by Interface 120. The two sets of instructions include (i) GPU instructions 410 and (ii) NPU instructions 420. In this example, the GPU instructions 410 are intended for execution by GPU 150 or another GPU that is considered native to the application, meaning that the application workload tasks were formatted for or directed to the native GPU or that the native GPU was pre-selected for processing image data for the application.

The NPU instructions 420, on the other hand, are intended for execution by NPU 170 or another hardware processing unit that is considered non-native to the application, meaning that the workload tasks received by interface 120 were not formatted specifically for or directed to the NPU 170 for execution and/or the NPU 170 was not pre-selected for processing image data for the particular application providing the workload tasks to the interface 120.

In this example, at least one of the workload tasks that are received includes a task to generate and/or render high-resolution images for the application. In some instances, this task (to generate or render high-resolution images) originates from a source external to the application code. This instruction, for example, may originate from user input provided to the computing system 100. The instruction may also be automatically generated in response to the computing system 100 detecting the capabilities of the display device 165, which include a capability to render images at a resolution that is greater than a resolution requested by the application.

When interface 120 detects a specific task for functionality within the workload tasks more suited for a non-native hardware processing unit (e.g., NPU 170) than it would be for the native hardware processing unit (e.g., GPU 150), interface 120 splits up the workload tasks into different sets of instructions for the native and non-native hardware processing units.

By way of example, upon determining that GPU 150 is not configured to generate images at the resolution that the display device 165 is configured to display at and/or at a resolution that is requested by user input, which exceeds a resolution specified by the application 130, the interface 120 finds a hardware processing unit that has more capability for performing the task, such as NPU 170. In this instance, NPU 170 is more capable of performing the task of upscaling the images to a desired resolution because it is configured with machine learning models for performing super-resolution processing to transform images into high-resolution images at the desired resolution for the display device 165, whereas GPU 150 is not configured with the same machine learning models.

Interface 120, upon identifying the more suitable hardware processing unit for performing the particular task included in the workload tasks, separates that task from the other tasks to be performed by the native hardware processor (e.g., GPU 150).

Interface 120 also generates separate sets of instructions as control lists or other types of data structures that can be routed to queues of the hardware processors for execution by the hardware processors and/or that can be further processed by the APIs for the hardware processors and which may include compiling the instructions for execution.

In the current example, GPU instructions 410 include Instruction A, Instruction B, and Instruction D. Instructions A and B may comprise instructions for drawing image A and image B at a low resolution. Instruction D may be an instruction for accessing upscaled images from NPU 170 and/or for routing images A and B (after upscaling) to the display device for rendering.

NPU instructions 420 include Instruction C, an Instruction for Applying Upscaling, and Instruction E. Instruction C may be an instruction to access images generated from GPU 150, which occurs before upscaling images A and B. Instruction E may be an instruction to perform other processes, such as updating the machine learning models contained in the NPU 170 from a third-party source based on metrics detected during the upscaling of the images A and B, or a process to check for driver updates for NPU 170, to improve future performance of the NPU 170.

Notably, the GPU instructions 410 include a synchronization object 430 that creates a dependency between the two sets of instructions and that causes a delay in the execution of at least one instruction (Instruction D) until a signal notification is received from the execution of Instruction for Applying Upscaling. The use of signals and fences to create dependencies is known and will not be described in more detail herein, particularly given the variety and types of scripts that may be used to create and apply the signals and fences. It is also noted that the referenced signals and fences are only one example of a synchronization object that may be used to create dependencies between the sets of instructions and to synchronize the execution of the sets of instructions in a controlled manner.

Notably, the use of the synchronization objects can cause a delayed execution of an instruction in a first set of instructions by a first hardware processing unit until after an instruction in a second set of instructions (e.g., upscaling instruction) is completed by a second hardware processing unit. Likewise, a synchronization object can also be used for delaying the execution of a particular instruction by the second hardware processing unit (e.g., performing the upscaling) until after a previous instruction in the first set of instructions has been executed by the first hardware processing unit (e.g., generation of the images to be upscaled).

Although this example only shows two sets of instructions, it will be appreciated that interface 120 may generate any number of different sets of instructions for different hardware storage devices, including multiple instruction sets for a single hardware processing unit. It will also be appreciated that despite the reference to a specific example of a synchronization object comprising a fence and signal structure, interface 120 may generate other types of synchronization objects, including timers and batching queues to synchronize the execution of the instructions included within the different sets of instructions.

Attention is now directed to FIG. 5. This figure illustrates a flow diagram 500 of acts associated with the disclosed functionality and methods that may be implemented by the disclosed systems (e.g., computing system 100) when a processor or processing system (e.g., CPU 110) executes stored executable-instructions stored in storage 105.

The first illustrated act includes the computing system accessing an interface that is configured, in response to receiving workload tasks from an application, to generate sets of instructions for performing the workload tasks by native and non-native hardware processing units (act 510). As previously described, the hardware processing units may comprise GPUs, NPUs, or any other processor capable of performing the functionality associated with the workload tasks.

The term "set" also should be interpreted as a non-empty set, such that each of the sets of instructions includes at least one instruction and, in many cases, a plurality of instructions.

The act of accessing the interface (act 510) may include the system generating, instantiating, or otherwise providing the interface. By way of example, the system can instantiate interface 120 when the CPU 110 executes the stored executable instructions 115.

The next illustrated act includes causing the interface, in response to receiving the workload tasks from the application, to generate a first set of instructions to be executed by the first processing unit for performing a first type of workload tasks and a second set of instructions to be executed by the second hardware processing unit for performing a second type of workload tasks (act 520).

In this regard, the instructions may be specifically written in a format corresponding to the hardware processing units that will execute the instructions (e.g., a format for execution by NVIDIA, Intel, or AMD processing units). Alternatively, the sets of instructions are written into a generic GPU format and compiled into specific formats for the GPUs or NPUs that will execute the instructions. In some instances, the first set of instructions is compiled in a first format and the second set of instructions is compiled in a second format that is different than the first format.

The next act (act 530), which may also be a part of act 520, includes providing at least one synchronization object contained with the first and/or second sets of instructions for synchronizing coordinated execution of the first and second sets of instructions. This synchronization object may include fence and signal scripts, as described, or any other synchronization object that is capable of synchronizing the execution of the first and second sets of instructions.

Next, the computing system submits the first set of instructions to the first hardware processing unit for execution by the first hardware processing unit (act 540) and the second set of instructions to the second hardware processing unit for execution by the second hardware processing unit (act 550).

In some instances, the first set of instructions is submitted to a GPU that is native to the application from which the workload tasks are derived, and the second set of instructions is submitted to an NPU or other GPU that is non-native to the application. In some instances, the second set of instructions includes instructions for performing super-resolution processing, such as upscaling images that are generated by the GPU in a first and lower resolution to images having a second and higher resolution.

Notably, the different resolutions can be any resolutions that are relatively lower and higher, respectively. For example, the first or second resolution can be a resolution of 640×480 pixels, 1280×720 pixels, 1920×1080 pixels, 3840× 2160 pixels (4 k), 7680×4320 pixels (8 k), or another resolution. It will be appreciated, however, that these are only a few examples of different resolutions that could be used, as there are almost infinite resolutions that could be used in the disclosed embodiments.

It will be appreciated that the disclosed methods may be practiced by a computer system comprising two or more processors and computer-readable media such as computer memory. In particular, the computer memory may store computer-executable instructions that when executed by one or more of the processors cause various functions to be performed, such as the acts recited in the embodiments.

Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions are physical storage media. Computer-readable media that carry computer-executable instructions are transmission media. Thus, by way of example, embodiments of the disclosure can comprise at least two distinctly different kinds of computer-readable media: physical computer-readable storage media and transmission computer-readable media.

Physical computer-readable storage media includes random access memory (RAM), read-only memory (ROM), programmable read-only memory (EEPROM), compact disk ROM (CD-ROM), or other optical disk storage (such as compact disks (CDs), digital video disks (DVDs), etc.), magnetic disk storage or other magnetic storage devices, or any other hardware storage devices which can be used to store desired program code in the form of computer-executable instructions or data structures and which can be accessed by a general purpose or special purpose computer.

When information is transferred or provided over a network or another communications connection (either hardwired, wireless, or a combination of hardwired or wireless) to a computer, as described herein, the computer properly views the connection as a transmission medium. Transmission media can include a network and/or data links that can be used to carry or desired program code means in the form of computer-executable instructions or data structures and which can be accessed by a general purpose or special purpose computer. Combinations of the above are also included within the scope of computer-readable media.

Further, upon reaching various computer system components, program code in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a network interface card (NIC)), and then eventually transferred to computer system RAM and/or less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosed embodiments may be practiced in network computing environments with many types of computer system configurations, including, personal computers (PCs), desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The disclosed embodiments may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for processing a workload for an application, the method comprising:

providing an interface that is configured, in response to receiving workload tasks from the application, to generate sets of instructions for performing the workload tasks;

causing the interface, in response to receiving the workload tasks from the application, to generate a first set of instructions to be executed by a first processing unit for performing a first type of workload tasks and a second set of instructions to be executed by a second hardware processing unit that is non-native to the application for performing a second type of workload tasks, the second hardware processing unit being distinct from the first hardware processing unit;

providing a synchronization object with the first and/or second sets of instructions;

submitting the first set of instructions to the first hardware processing unit for execution by the first hardware processing unit;

submitting the second set of instructions to the second hardware processing unit for execution by the second hardware processing unit; and generating a third set of instructions for performing workload tasks on images generated by the first or second hardware processing units, the third set of instructions for execution by a third hardware processing unit, the third hardware processing unit being distinct from the first hardware processing unit and the second hardware processing unit, wherein the third set of instructions for performing workload tasks on images generated by the first or second hardware processing units is to transform a style of the images generated by the first or second hardware processing units.

2. The method of claim 1, wherein the method further comprises:

identifying the second hardware processing unit from a plurality of hardware processing units based on a determination that the second hardware processing unit has a capability for performing the second type of workload task that is greater than a capability for performing the second type of workload task by another processing unit in the plurality of hardware processing units.

3. The method of claim 2, wherein the second type of workload task comprises super-resolution processing.

4. The method of claim 1, wherein the first hardware processing unit comprises a GPU (graphics processing unit).

5. The method of claim 4, wherein the second hardware processing unit is an NPU (neural processing unit) configured for generating super-resolution images in response to receiving images at a first resolution by upscaling the images to a second resolution that is higher than the first resolution.

6. The method of claim 4, wherein the second hardware processing unit comprises a secondary GPU.

7. The method of claim 1, wherein the synchronization object comprises signal and fence instructions contained within the first set of instructions for delaying execution of an instruction in the first set of instructions by the first hardware processing unit until after an instruction in the second set of instructions is completed by the second hardware processing unit.

8. The method of claim 7, wherein the synchronization object comprises additional signal and fence instructions contained within the second set of instructions for delaying an execution of a particular instruction in the set of instructions by the second hardware processing unit until after a particular instruction in the first set of instructions has been executed by the first hardware processing unit.

9. The method of claim 1, wherein the method further comprises:

compiling the first set of instructions into a first format and compiling the second set of instructions into a second format.

10. The method of claim 1, wherein the style is an animation style.

11. A computing system comprising:

a processing system;

a first hardware processing unit;

a second hardware processing unit; and a storage device storing computer-executable instructions that are executable by the processing system to cause the computing system to implement operations comprising:

providing an interface that is configured, in response to receiving workload tasks from an application, to generate sets of instructions for performing the workload tasks;

causing the interface, in response to receiving the workload tasks from the application, to generate a first set of instructions to be executed by a first processing unit for performing a first type of workload tasks and a second set of instructions to be executed by a second hardware processing unit for performing a second type of workload tasks, the first processing unit being native to the application and the second processing unit being non-native to the application, the second hardware processing unit being distinct from the first hardware processing unit;

providing a synchronization object contained within the first or second sets of instructions for synchronizing coordinated execution of the first and second sets of instructions;

submitting the first set of instructions to the first hardware processing unit for execution by the first hardware processing unit;

submitting the second set of instructions to the second hardware processing unit for execution by the second hardware processing unit; and generating a third set of instructions for performing workload tasks on images generated by the first or second hardware processing units, the third set of instructions for execution by a third hardware processing unit, the third hardware processing unit being distinct from the first hardware processing unit and the second hardware processing unit, wherein the third set of instructions for performing workload tasks on images generated by the first or second hardware processing units is to transform a style of the images generated by the first or second hardware processing units.

12. The computing system of claim 11, wherein the operations further comprise:

identifying the second hardware processing unit from a plurality of hardware processing units based on a determination that the second hardware processing unit has a capability for performing the second type of workload task that is greater than a capability for performing the second type of workload task by another processing unit in the plurality of hardware processing units.

13. The computing system of claim 12, wherein the second type of workload task comprises super-resolution processing.

14. The computing system of claim 11, wherein the first hardware processing unit comprises a GPU (graphics processing unit).

15. The computing system of claim 14, wherein the second hardware processing unit is an NPU (neural processing unit) configured for generating super-resolution images in response to receiving images at a first resolution by upscaling the images to a second resolution that is higher than the first resolution.

16. The computing system of claim 11, wherein the synchronization object comprises signal and fence instructions contained within the first set of instructions for delaying execution of an instruction in the first set of instructions by the first hardware processing unit until after a previous instruction contained within the first set of instructions has been executed by the first hardware processing unit and until after the second set of instructions is completed by the second hardware processing unit.

17. The computing system of claim 16, wherein the synchronization object comprises additional signal and fence instructions contained within the second set of instructions for delaying execution of the second set of instructions by the second hardware processing unit until after a particular instruction in the first set of instructions has been executed by the first hardware processing unit.

18. The computing system of claim 11, wherein the operations further comprise:

compiling the first set of instructions into a first format and compiling the second set of instructions into a second format.

19. A method for processing a workload associated with image processing for an application, the method comprising:

accessing an interface that is configured, in response to receiving workload tasks from the application, to generate sets of instructions for performing the workload tasks to perform the image processing;

causing the interface, in response to receiving the workload tasks from the application, to generate a first set of instructions to be executed by a first processing unit for generating images and a second set of instructions to be executed by a second hardware processing unit for upscaling the images, the second hardware processing unit being distinct from the first hardware processing unit;

submitting the first set of instructions to the first hardware processing unit for generating the images;

submitting the second set of instructions to the second hardware processing unit for upscaling the images;

coordinating execution of the first and second sets of instructions with a synchronization object provided with the first and/or second sets of instructions; and generating a third set of instructions for performing workload tasks on images generated by the first or second hardware processing units, the third set of instructions for execution by a third hardware processing unit, the third hardware processing unit being distinct from the first hardware processing unit and the second hardware processing unit, wherein the third set of instructions for performing workload tasks on images generated by the first or second hardware processing units is to transform a style of the images generated by the first or second hardware processing units.

20. The method of claim 19, wherein the style is an animation style.

\* \* \* \* \*